United States Patent
Jayaraman

(10) Patent No.: US 10,656,810 B2
(45) Date of Patent: May 19, 2020

(54) IMAGE BACKGROUND REMOVAL USING MULTI-TOUCH SURFACE INPUT

(71) Applicant: Hewlett-Packard Development Company, L.P., Houston, TX (US)

(72) Inventor: Karthik Jayaraman, Sunnyvale, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 178 days.

(21) Appl. No.: 15/329,495

(22) PCT Filed: Jul. 28, 2014

(86) PCT No.: PCT/US2014/048490
§ 371 (c)(1),
(2) Date: Jan. 26, 2017

(87) PCT Pub. No.: WO2016/018232
PCT Pub. Date: Feb. 4, 2016

(65) Prior Publication Data
US 2017/0322707 A1    Nov. 9, 2017

(51) Int. Cl.
*G06K 9/46* (2006.01)
*G06K 9/48* (2006.01)
(Continued)

(52) U.S. Cl.
CPC ........ *G06F 3/04845* (2013.01); *G06F 3/0416* (2013.01); *G06F 3/0488* (2013.01);
(Continued)

(58) Field of Classification Search
None
See application file for complete search history.

(56) References Cited

U.S. PATENT DOCUMENTS

| 6,920,619 B1 | 7/2005 | Milekic |
| 7,599,561 B2 | 10/2009 | Wilson et al. |

(Continued)

FOREIGN PATENT DOCUMENTS

| TW | 201419114 | 5/2014 |
| WO | WO-2013/108031 A2 | 7/2013 |

OTHER PUBLICATIONS

How to RemoveBackgrounds with Clipping Magic—Clipping Magic Tutorial (https://www.youtube.com/watch?v=kYBd6zWfonE, Jul. 7, 2014) (Year: 2014).*

(Continued)

*Primary Examiner* — Randolph I Chu
(74) *Attorney, Agent, or Firm* — HP Inc. Patent Department

(57) ABSTRACT

Examples of image background removal using a multi-touch surface input are disclosed. One example implementation according to aspects of the present disclosure may include a computing system to display an image on a display of the computing system and to project the image onto a multi-touch surface of the computing system, the multi-touch surface to receive a touch input. The computing system receives a foreground input on the multi-touch surface indicative of a foreground region within the image and a background input on the multi-touch surface indicative of a background region within the image. The computing system then removes the background region from the image based on the foreground input and the background input.

18 Claims, 6 Drawing Sheets

(51) Int. Cl.
*G06F 3/0484* (2013.01)
*G06F 3/14* (2006.01)
*G09G 5/14* (2006.01)
*G09G 3/00* (2006.01)
*G06F 3/0488* (2013.01)
*G06F 3/041* (2006.01)

(52) U.S. Cl.
CPC ............... *G06F 3/14* (2013.01); *G09G 3/001* (2013.01); *G09G 5/14* (2013.01)

(56) References Cited

U.S. PATENT DOCUMENTS

| | | | |
|---|---|---|---|
| 7,656,394 | B2 | 2/2010 | Westerman et al. |
| 7,710,391 | B2 | 5/2010 | Bell et al. |
| 8,121,640 | B2 | 2/2012 | Russ et al. |
| 8,199,117 | B2 | 6/2012 | Izadi et al. |
| 8,286,102 | B1 | 10/2012 | Wilensky |
| 8,736,583 | B2 | 5/2014 | Anderson et al. |
| 2005/0078092 | A1 | 4/2005 | Clapper |
| 2008/0018591 | A1 | 1/2008 | Pittel et al. |
| 2009/0128716 | A1 | 5/2009 | Nagashima et al. |
| 2011/0087990 | A1 | 4/2011 | Ng et al. |
| 2011/0185297 | A1 | 7/2011 | Reid et al. |
| 2011/0242054 | A1 | 10/2011 | Tsu |
| 2012/0105358 | A1 | 5/2012 | Momeyer et al. |
| 2012/0327172 | A1* | 12/2012 | El-Saban ........... G06K 9/00228 348/14.02 |
| 2013/0009869 | A1 | 1/2013 | Wilensky |
| 2013/0077236 | A1 | 3/2013 | Becze et al. |
| 2013/0257888 | A1 | 10/2013 | Behrens et al. |
| 2013/0272591 | A1* | 10/2013 | Xue ....................... G06T 11/003 382/131 |
| 2014/0232695 | A1* | 8/2014 | McGaughan ......... G06F 3/0426 345/175 |
| 2016/0005166 | A1* | 1/2016 | Xu ........................ G06T 11/003 382/128 |

OTHER PUBLICATIONS

Epson EB-595WiFinger Touch Interactive Projector (https://www.youtube.com/watch?v=Os_1qh_dclw, Jun. 4, 2014) (Year: 2014).*

Izadi et al., "C-Slate: A Multi-Touch and Object Recognition System for Remote Collaboration using Horizontal Surfaces," 2007, pp. 3-10, IEEE.

Muller, "Multi-Touch Displays: Design, Applications and Performance Evaluation," Grid Computing—Master's Thesis, University of Amsterdam, Jun. 20, 2008, pp. 1-96.

* cited by examiner

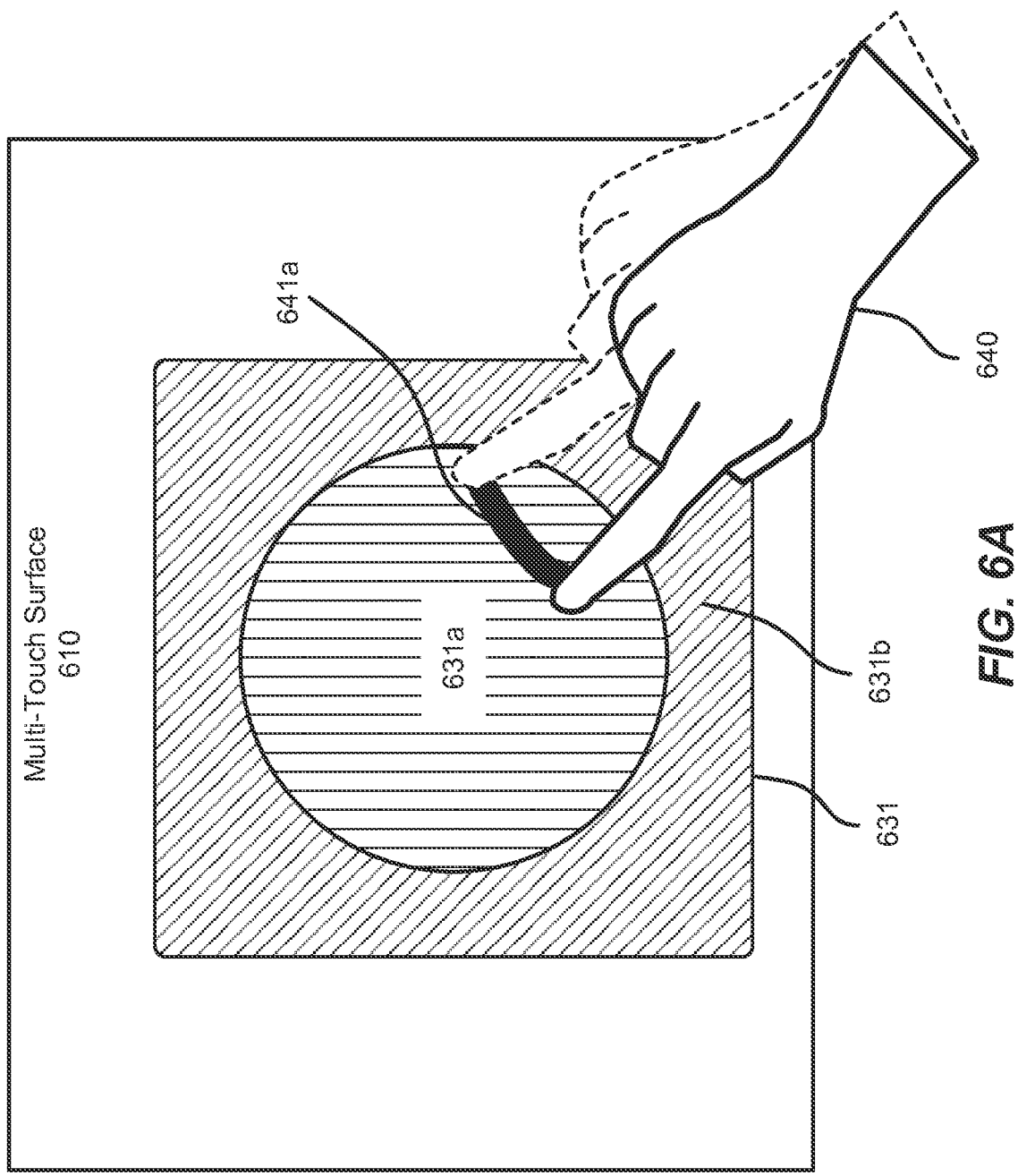

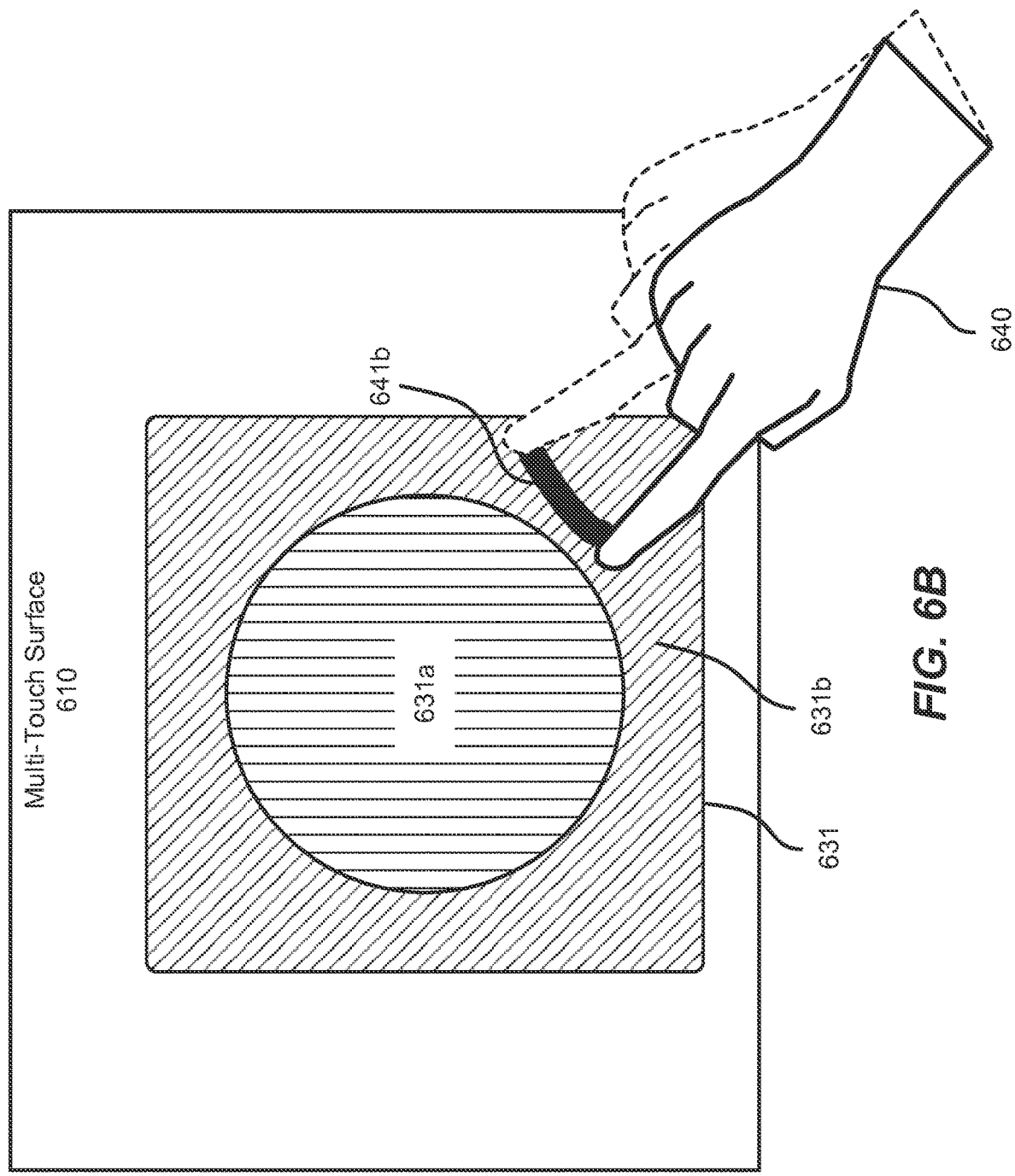

IMAGE BACKGROUND REMOVAL USING MULTI-TOUCH SURFACE INPUT

BACKGROUND

Many computing devices and other electronic devices, such as mobile phones, desktop and laptop computers, tablets, digital cameras, and other similar devices are capable of capturing and displaying electronic images. As such, the number of digital images continues to increases. Users may desire to view and interact with these digital images through the computing devices.

BRIEF DESCRIPTION OF THE DRAWINGS

The following detailed description references the drawings, in which:

FIGS. 6A and 6B illustrate a foreground input and a background input received at a multi-touch surface indicative of a foreground region and a background region respectively according to examples of the present disclosure.

DETAILED DESCRIPTION

Image manipulation continues to be a desirable feature to users of computing devices and other electronic devices capable of capturing and displaying electronic images. For example, a user of a computing device may desire to capture an electronic image of an object (or upload a previously captured, existing electronic image) and then manipulate the resulting electronic image. On such desired manipulation is known as assisted segmentation or background removal during which a background portion of the image is removed while preserving the foreground portion. For example, if an image of a dog in a field is captured, the user may wish to remove the field region (i.e., background region) of the image while preserving the dog region (i.e., foreground region).

Current implementations of assisted segmentation or background removal are not optimized for a multi-touch environment and/or a multi-display environment. Moreover, current assisted segmentation does not provide for manipulating the image during the background removal process. Additionally, multiple background removal "undos" and "redos" are not provided for.

Various implementations are described below by referring to several examples of image background removal using multi-touch surface inputs. In one example implementation, a computer-implemented method includes displaying an image on a display while projecting the image onto a multi-touch surface to receive a touch input. The computer-implemented method further includes receiving a foreground input on the multi-touch surface indicative of a foreground region within the image and a background input on the multi-touch surface indicative of a background region within the image. The computer-implemented method also includes removing the background region from the image based on the foreground input and the background input. Other example implementations of image background removal using multi-touch surface inputs are described below.

In some implementations, the background removal enables the selection of regions to remove (i.e., background) and keep (i.e., foreground) from the electronic image. The background removal may occur in real-time on the display while the user provides inputs indicative of the background and foreground regions on the multi-touch surface. The background removal also enables the manipulation of the image projected on the multi-touch surface during the background removal. The techniques described also provide for undoing and redoing multiple background removals. These and other advantages will be apparent from the description that follows.

Figure 1:
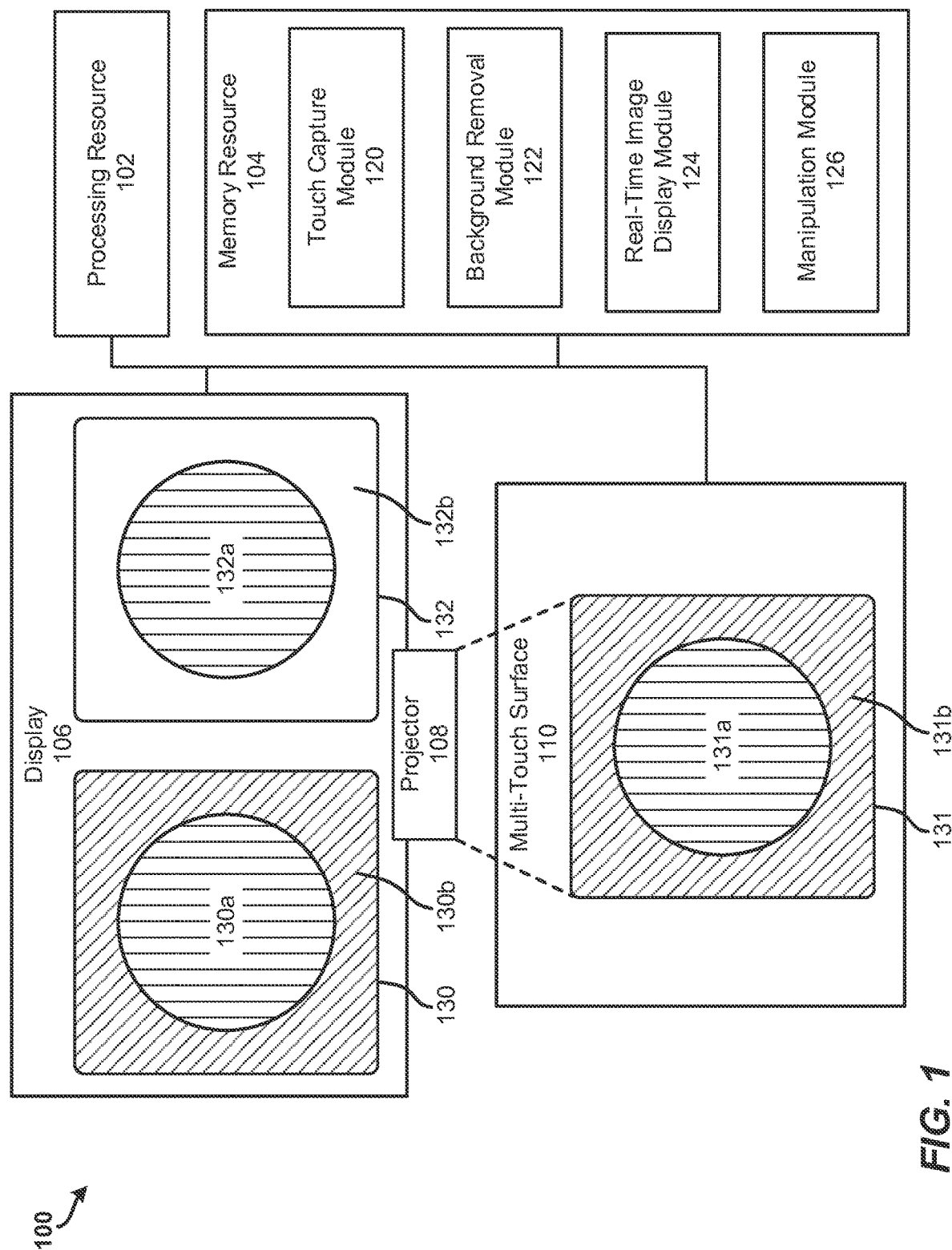
FIG. 1 illustrates a computing system to remove image backgrounds using a multi-touch surface input according to examples of the present disclosure.
Figure 3:
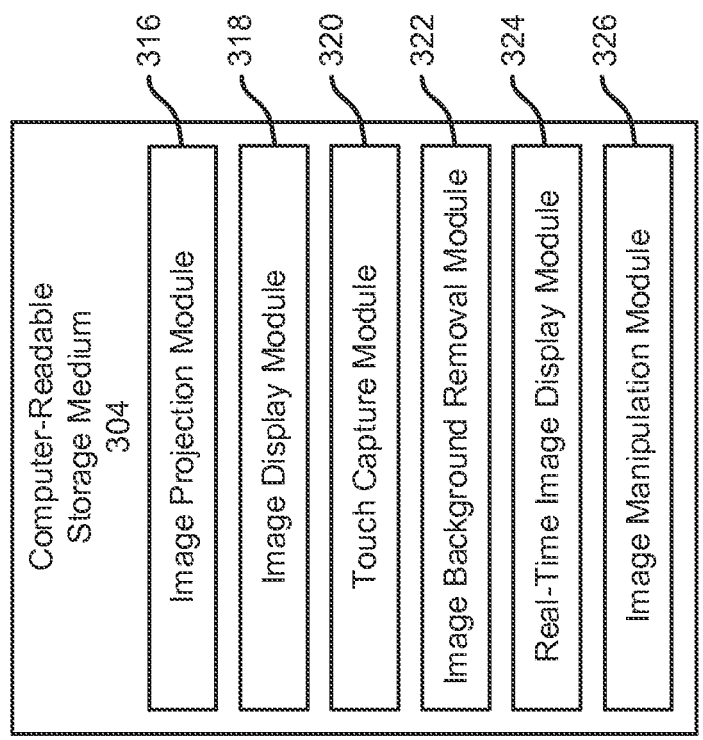
FIG. 3 illustrates a computer-readable storage medium storing instructions to remove image backgrounds using a multi-touch surface input according to examples of the present disclosure.
Figure 2:
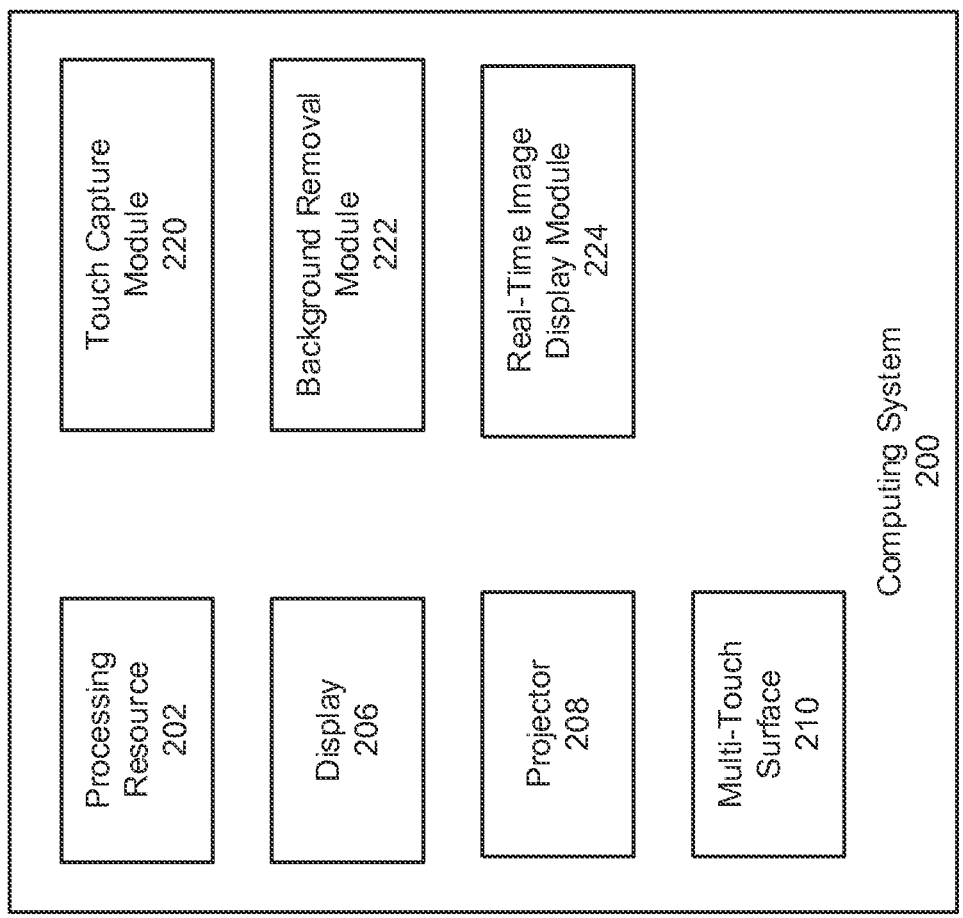
FIG. 2 illustrates computing system to remove image backgrounds using a multi-touch surface input according to examples of the present disclosure.

FIGS. 1-3 include particular components, modules, etc. according to various examples as described herein. In different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Generally, FIGS. 1-3 relate to components and modules of a computing system, such as computing system 100 of FIG. 1 and computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, or the like.

FIG. 1 illustrates a computing system 100 to remove image backgrounds using a multi-touch surface input according to examples of the present disclosure. The computing system 100 may include a processing resource 102 that represents generally any suitable type or form of processing unit or units capable of processing data or interpreting and executing instructions. The processing resource 102 may be one or more central processing units (CPUs), microprocessors, and/or other hardware devices suitable for retrieval and execution of instructions. The instructions may be stored, for example, on a non-transitory tangible computer-readable storage medium, such as memory resource 104 (as well as memory resource 204 of FIG. 2 and/or computer-readable storage medium 304 of FIG. 3), which may include any electronic, magnetic, optical, or other physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions may be stored during runtime, and a secondary memory, such as a nonvolatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

In addition, the computing system 100 may include a display 106, a projector 108, and a multi-touch surface 110. The display 106 represents generally any combination of hardware and programming configured to exhibit or present a message, image, view, or other presentation for perception by a user of the computing system 100. In examples, the display 106 may be or include a monitor, a touchscreen, a projection device, and/or a touch/sensory display device. The display 106 may display text, images, and other appropriate graphical content. In the example shown in FIG. 1, the display 106 displays two images in a side-by-side configuration. In other examples, other numbers of images may be shown in a variety of configurations.

Continuing with the side-by-side configuration example, an original image 130 is displayed alongside a modified image 132. The original image 130 represents an image before the application of the techniques described herein while the modified image 132 represents the same image after the techniques described are applied. More specifically, the original image 130 and the modified image 132 include foreground portions or regions 130a and 132a (referred to collectively as the "foreground") and background portions or regions 130b and 132b (referred to collectively as the "background"). The foreground is represented by vertical stripes with the background being the remaining area. In the example shown in FIG. 1, the background 130b of the original image 130 is represented by the oblique lines in relation to the foreground 130a. The background portion 132b of the modified image 132 shows the background being removed after the background removal techniques of the present disclosure are performed on the original image 130, as discussed in more detail below.

The projector 108 may be any suitable type of projection device to display an electronic image by projecting the image onto a surface such as multi-touch surface 110. The projector 108 may be integrated into the display 106 in examples, or the projector 108 may be a separate component communicatively coupled to the computing system 100. It should be understood that, in other examples, the functionality of the projector 108 and the multi-touch surface 110 may be combined into a singular device, such as a multi-touch display that is capable of displaying an image and receiving a multi-touch input. In examples, the display 106 is in an approximate vertical orientation and the multi-touch surface 110 is in an approximate horizontal position.

The multi-touch surface 110 may be any suitable type of input-receiving device to receive a touch input from a user. For example, the multi-touch surface 110 may be a track pad, touchscreen, or other device to recognize the presence of one or more points-of-contact with the multi-touch surface 110. The points-of-contact may include touches from a stylus, electronic pen, user finger, or other suitable source. The multi-touch surface 110 may receive multi-touch gestures, such as "pinch-to-zoom," multi-touch scrolling, multi-touch taps, multi-touch rotation, and other suitable gestures, including user-defined gestures.

In the example shown, the projector 108 projects a working image 131 onto the multi-touch surface 110. The working image 131 relates to the original image 130 in that the working image 131 is initially the same as the original image 130. The working image 131 may be manipulated, as discussed, and is used to select the foreground (keep) and background (remove) regions from the original image 130.

When the projector 108 projects working image 131 onto the multi-touch surface 110, it may also project an image editor interface (not shown). The image editor interface may provide additional options, as discussed below, such as background removal buttons (e.g., "keep" and "remove" buttons), process buttons (e.g., "undo" and "redo" buttons), and manipulation buttons (e.g., "scale," "rotate," and "move" buttons). The image editor interface may also provide an "accept" option to accept the modified image 132 after the background removal process has been performed (that is, after at least one "keep" and one "remove" function has been applied to the image).

In addition to the hardware components described, the computing system 100 may include a touch capture module 120, a background removal module 122, a real-time image display module 124, and a manipulation module 126. In one example, the modules described herein may be a combination of hardware and programming. The programming may be processor executable instructions stored on a computer-readable storage medium or tangible memory resource such as the memory resource 104, and the hardware may include the processing resource 102 for executing those instructions. Thus memory resource 104 can be said to store program instructions that when executed by the processing resource 102 implement the modules described herein. Other modules may also be utilized as will be discussed further below in other examples.

The touch capture module 120 captures touch gestures from a user via the multi-touch surface 110. In particular, the touch capture module 120 captures "keep" and "remove" gestures. More generally, the touch capture module 120 captures a foreground input on the multi-touch surface indicative of a foreground region within the image and also captures a background input on the multi-touch surface indicative of a background region within the image. It should be understood that the multi-touch gesture(s) may also include a single touch input.

In an example, a user may select, via an image editor interface, to provide a foreground input (i.e., a "keep" gesture) on the multi-touch surface 110 indicative of a foreground region 130a within the original image 130. Such an example is illustrated in FIG. 6A as discussed below. The foreground input is a user input indicative of or relating to a region of the image that represents a foreground portion of the image. In examples, this may include an object of an image. The multi-touch surface 110 captures (utilizing the multi-touch capture module 120) the user's input (whether it be by finger, stylus, or other suitable input method) on the working image 131 of the multi-touch surface 110 and associates it with the foreground region 130a. The association may be performed, for example, by associating a color, such as green, with the keep gesture.

Similarly, a user may select, via the image editor interface, to provide a background input (i.e., a "remove" gesture) on the multi-touch surface 110 indicative of a background region 130b within the original image 130. Such an example is illustrated in FIG. 6B as discussed below. The background input is a user input indicative of or relating to a region of the image that represents a background portion of the image. In examples, this may include the portion of the image that is not the object of image (i.e., the "background" outside of the object of the image). The multi-touch surface 110 captures (utilizing the multi-touch capture module 120) the user's input on the working image 131 of the multi-touch surface 110 and associates it with the background region. The association may be performed, for example, by associating a color, such as red, with the keep gesture. It should be understood that any suitable color may be associated with either the background region or the foreground region, although it may be desirable to utilize distinct colors for each of the background region and the foreground region. Once the touch capture module 120 has captured inputs associated with the foreground region 130a and the background region 130b of the original image 130, the captured touches may be passed to the background removal module 122.

In examples, the captured inputs associated with the foreground region 130a and the background region 130b of the original image 130 may be stored on a layer not visible to the user using electronic ink. The layer may contain the color of the keep and remove gestures (also referred to as strokes as in stroke 641a and stroke 641b of FIGS. 6A and 6B respectively) representing the foreground region and background region respectively. For example, in the scenario where green strokes represents the foreground region and red strokes represent the background region, the layer may contain green and red strokes in electronic ink corresponding to the regions to be kept and removed. Multiple keep and remove strokes may be tracked and incrementally numbered such that a first keep stroke is green1, a second keep stroke is green2, etc., and a first remove stroke is red1, a second remove stroke is red 2, etc.

The background removal module 122 removes the background region from the image based on the foreground input and the background input. In an example, the color strokes of electronic ink stored in the layer (i.e., green1, green2, red1, red 2, etc.) may be utilized in removing the background region 130b from the foreground region 130a of the original image 130. That is, the background removal module 122 removes the background regions marked with the red strokes while keeping the foreground regions marked with the green strokes.

While the background removal module 122 performs the background removal process, the real-time image display module 124 displays the modified image 132 on the display 106. As shown in FIG. 1, the background region 132b is removed in the modified image 132, while the foreground region 132a remains. If a first keep stroke (green1) and a first remove stroke (red1) is performed by a user, the background removal module 122 performs the background remove and the real-time image display module 124 displays the modified image 132 on the display. If a second keep stroke (green2) (or a second remove stroke (red2)) is applied, the real-time image display module 124 updates the modified image 132 accordingly, in real-time, so that the user can observe the effect of the stroke.

During the background removal process, the user may desire to "undo" (that is, reverse) an action and/or "redo" (that is, repeat) an action. For example, if the user applies a second keep stroke and then sees, via the real-time image display module 124, that the user does not want to perform the second keep stroke, the user may "undo" the action by pressing an undo button, performing an undo gesture, and/or pressing an undo keyboard shortcut command. Similarly, the user may also "redo" an action by pressing a redo button, performing a redo gesture, and/or pressing a redo keyboard shortcut command. It should be understood that the undo/redo process may be stroke specific—a single stroke may be undone or redone.

During the background removal process, the user may also desire to manipulate the working image 131. The manipulation module 126 manipulates the working image 131 projected onto the multi-touch surface 110. For example, it may be desirable to manipulate the working image 131 by rotating, moving, scaling, etc., the working image 131. By manipulating the working image 131, a user of the computing system 100 may be better able to utilize the background removal process. For example, a manipulation input may include a variety of different image manipulations to be applied to the projected image. For example, a rotation input may be received to cause the projected image to be rotated. A scaling input may be received to cause the projected image to be scaled (i.e., made larger or smaller such as through zooming). A repositioning input may be received to cause the projected image to be moved to a different location in relation to the multi-touch surface. The repositioning input may be particularly useful in combination with the rotation input and/or the scaling input. Consequently, it should be understood that the manipulation inputs may be applied in any combination, in any order, and/or any number of times. For example, the projected image may be scaled, rotated, moved, scaled, and rotated.

The manipulation module 126 may utilize the touch capture module 120 to capture gestures relating to a desired manipulation. For example, the multi-touch surface 110 may receive multi-touch gestures, such as "pinch-to-zoom," multi-touch scrolling, multi-touch taps, multi-touch rotation, and other suitable gestures, including user-defined gestures. The manipulation module 126 may perform an appropriate manipulation on the working image 131 based on the received multi-touch gesture. It should be understood that the multi-touch gesture may also include a single touch input.

In examples, if the manipulation module 126 manipulates the working image 131 based on the received touch input(s) captured by the touch capture module 120, the modified image 132 is not manipulated. Rather, the modified image 132 remains in its original orientation with its original size (as in original image 130) with the only changes being background removal by the background removal module 122. However, in other examples, the modified image 132 may be correspondingly manipulated based on the received touch input(s) captured by the touch capture module 120 such that the modified image 132 is manipulated in the same manner as working image 131.

FIG. 2 illustrates computing system 200 to remove image backgrounds using a multi-touch surface input according to examples of the present disclosure. Similarly to the computing system 100 of FIG. 1, the example computing system 200 of FIG. 2 includes a processing resource 202, a display 206, a projector 208, and a multi-touch surface 210.

Additionally, the computing system 200 includes a touch capture module 220, a background removal module 222, and a real-time image display module 224. These modules may be stored, for example, in a computer-readable storage medium such as a memory or computer-readable storage medium, or the modules may be implemented using dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The touch capture module 220 captures touch gestures from a user via the multi-touch surface 210. In particular, the touch capture module 220 captures "keep" and "remove" gestures. More generally, the touch capture module 220 captures a foreground input on the multi-touch surface indicative of a foreground region within the image and also captures a background input on the multi-touch surface indicative of a background region within the image. It should be understood that the multi-touch gesture(s) may also include a single touch input.

In an example, a user may select, via an image editor interface, to provide a foreground input (i.e., a "keep" gesture) on the multi-touch surface 210 indicative of a foreground region 230a within the original image 230. Such an example is illustrated in FIG. 6A as discussed below. The multi-touch surface 210 captures (utilizing the multi-touch capture module 220) the user's input (whether it be by finger, stylus, or other suitable input method) on the working image of the multi-touch surface 210 and associates it with the foreground region. The association may be performed, for example, by associating a color, such as green, with the keep gesture.

Similarly, a user may select, via the image editor interface, to provide a background input (i.e., a "remove" gesture) on the multi-touch surface 210 indicative of a background region within the original image. Such an example is illustrated in FIG. 6B as discussed below. The multi-touch surface 210 captures (utilizing the multi-touch capture module 220) the user's input on the working image of the multi-touch surface 210 and associates it with the background region. The association may be performed, for example, by associating a color, such as red, with the keep gesture. It should be understood that any suitable color may be associated with either the background region or the foreground region, although it may be desirable to utilize distinct colors for each of the background region and the foreground region. Once the touch capture module 220 has captured inputs associated with the foreground region and the background region of the original image, the captured touches may be passed to the background removal module 222.

In examples, the captured inputs associated with the foreground region and the background region of the original image 230 may be stored on a layer not visible to the user using electronic ink. The layer may contain the color of the keep and remove gestures (also referred to as strokes as in stroke 641a and stroke 641b of FIGS. 6A and 6B respectively) representing the foreground region and background region respectively. For example, in the scenario where green strokes represents the foreground region and red strokes represent the background region, the layer may contain green and red strokes in electronic ink corresponding to the regions to be kept and removed. Multiple keep and remove strokes may be tracked and incrementally numbered such that a first keep stroke is green1, a second keep stroke is green2, etc., and a first remove stroke is red1, a second remove stroke is red 2, etc.

The background removal module 222 removes the background region from the image based on the foreground input and the background input. In an example, the color strokes of electronic ink stored in the layer (i.e., green1, green2, red1, red 2, etc.) may be utilized in removing the background region 230b from the foreground region of the original image. That is, the background removal module 222 removes the background regions marked with the red strokes while keeping the foreground regions marked with the green strokes.

While the background removal module 222 performs the background removal process, the real-time image display module 224 displays the modified image on the display 206. The background region is removed in the modified image, while the foreground region remains. If a first keep stroke (green 1) and a first remove stroke (red1) is performed by a user, the background removal module 222 performs the background remove and the real-time image display module 224 displays the modified image 232 on the display. If a second keep stroke (green2) (or a second remove stroke (red2)) is applied, the real-time image display module 224 updates the modified image accordingly, in real-time, so that the user can observe the effect of the stroke.

During the background removal process, the user may desire to "undo" (that is, reverse) an action and/or "redo" (that is, repeat) an action. For example, if the user applies a second keep stroke and then sees, via the real-time image display module 124, that the user does not want to perform the second keep stroke, the user may "undo" the action by pressing an undo button, performing an undo gesture, and/or pressing an undo keyboard shortcut command. Similarly, the user may also "redo" an action by pressing a redo button, performing a redo gesture, and/or pressing a redo keyboard shortcut command. It should be understood that the undo/redo process may be stroke specific—a single stroke may be undone or redone.

FIG. 3 illustrates a computer-readable storage medium 304 storing instructions to remove image backgrounds using a multi-touch surface input according to examples of the present disclosure. The computer-readable storage medium 304 is non-transitory in the sense that it does not encompass a transitory signal but instead is made up of one or more memory components configured to store the instructions. The computer-readable storage medium may be representative of the memory resource 104 of FIG. 1 and may store machine executable instructions in the form of modules, which are executable on a computing system such as computing system 100 of FIG. 1 and/or computing system 200 of FIG. 2.

In the example shown in FIG. 3, the modules may include an image projection module 316, an image display module 318, a touch capture module 320, an image background removal module 322, a real-time image display module 324, and an image manipulation module 326. The modules of the computer-readable storage medium 304 may be executable so as to perform the techniques described herein, including the functionality described regarding the method 400 of FIG. 4. The functionality of these modules is described below with reference to the functional blocks of FIG. 4 but should not be construed as so limiting.

Figure 4:
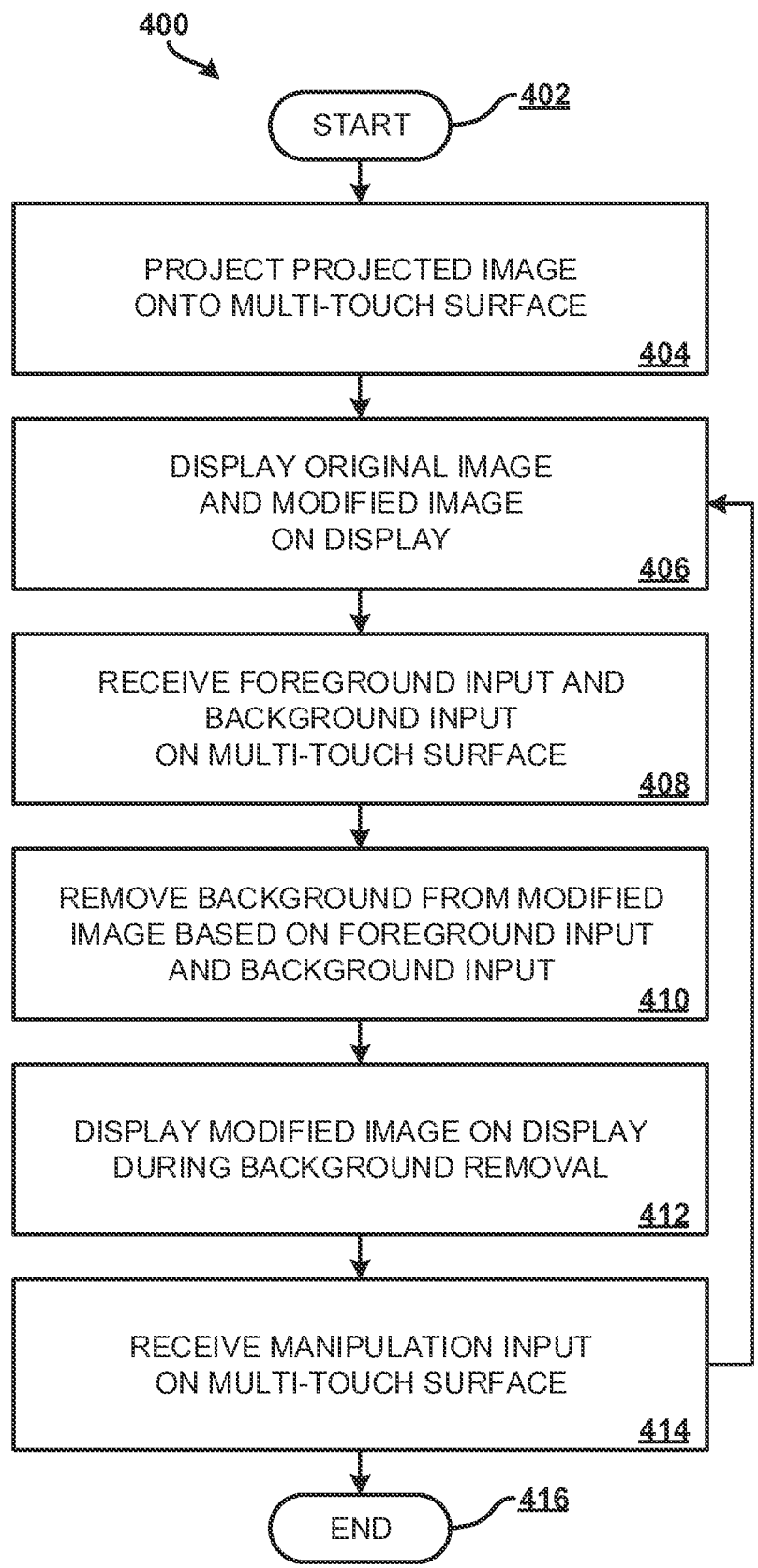
FIG. 4 illustrates a flow diagram of a method for removing image backgrounds using a multi-touch surface input according to examples of the present disclosure.

In particular, FIG. 4 illustrates a flow diagram of a method 400 for removing image backgrounds using a multi-touch surface input according to examples of the present disclosure. The method 400 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1 and/or processing resource 202 of FIG. 2), cause the processor to perform the method 400. It should be appreciated that the method 400 may be executed by a computing system or a computing device such as computing system 100 of FIG. 1 and/or computing system 200 of FIG. 2.

At block 402, the method 400 begins and continues to block 404. At block 404, the image projection module 316 projects a projected image onto a multi-touch surface (e.g., multi-touch surface 110 of FIG. 1 and/or multi-touch surface 210 of FIG. 2) to receive a touch input, the projected image being representative of an original image. The method 400 continues to block 406.

At block 406, the image display module 318 displays the original image and a modified image concurrently on a display (e.g., display 106 of FIG. 1 and/or display 206 of FIG. 2), the modified image being representative of the projected image. The method 400 continues to block 408.

At block 408, the touch capture module 320 receives a foreground input on the multi-touch surface indicative of a foreground region within the original image and to receive a background input on the multi-touch surface indicative of a background region within the original image. The method 400 continues to block 410.

At block 410, the image background removal module 322 removes the background region from the modified image displayed on the display based on the foreground input and the background input. The method 400 continues to black 412.

At block 412, the real-time image display module 324 displays the modified image on the display while the background removal module removes the background region from the image. The method 400 continues to black 414.

At block 414, the image manipulation module 326 receives a manipulation input on the multi-touch surface to cause the projected image to be manipulated and to manipulate the projected image on the multi-touch surface. The method continues to block 416, at which point the method 400 ends.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
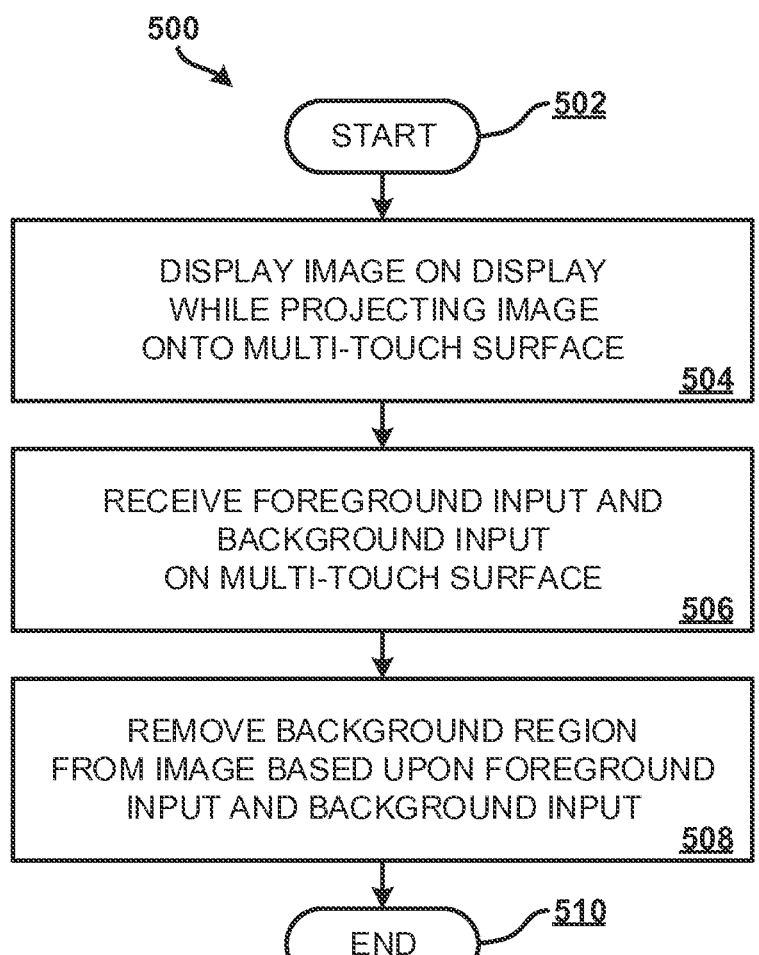
FIG. 5 illustrates a flow diagram of a method for removing image backgrounds using a multi-touch surface input according to examples of the present disclosure.

FIG. 5 illustrates a flow diagram of a method for removing image backgrounds using a multi-touch surface input according to examples of the present disclosure. The method 500 may be executed by a computing system or a computing device such as computing system 100 of FIG. 1 and/or computing system 200 of FIG. 2. The method 500 may also be stored as instructions on a non-transitory computer-readable storage medium such as computer-readable storage medium 304 of FIG. 3 that, when executed by a processor (e.g., processing resource 102 of FIG. 1 and/or processing resource 202 of FIG. 2), cause the processor to perform the method 500.

At block 502, the method 500 begins and continues to block 504. At block 504, the method 500 includes a computing system (e.g., computing system 100 of FIG. 1 and/or computing system 200 of FIG. 2) displaying an image on a display (e.g., display 106 of FIG. 1 and/or display 206 of FIG. 2) while projecting (e.g., via the projector 108 of FIG. 1 and/or the projector 208 of FIG. 2) the image onto a multi-touch surface (e.g., multi-touch surface 110 of FIG. 1 and/or multi-touch surface 210 of FIG. 2) to receive a touch input. The method continues to block 506.

At block 506, the method 500 includes the computing system (e.g., computing system 100 of FIG. 1 and/or computing system 200 of FIG. 2) receiving a foreground input on the multi-touch surface (e.g., multi-touch surface 110 of FIG. 1 and/or multi-touch surface 210 of FIG. 2) indicative of a foreground region within the image and a background input on the multi-touch surface indicative of a background region within the image. The method continues to block 508.

At block 508, the method 500 includes the computing system (e.g., computing system 100 of FIG. 1 and/or computing system 200 of FIG. 2) removing the background region from the image based on the foreground input and the background input. The method continues to block 510, at which point the method 500 ends.

Additional processes also may be included, and it should be understood that the processes depicted in FIG. 5 represent illustrations, and that other processes may be added or existing processes may be removed, modified, or rearranged without departing from the scope and spirit of the present disclosure.

FIGS. 6A and 6B illustrate a foreground input and a background input received at a multi-touch surface indicative of a foreground region and a background region respectively according to examples of the present disclosure. In an example shown in FIG. 6A, a user may select, via an image editor interface, to provide a foreground input (i.e., a "keep" gesture) on the multi-touch surface 610 indicative of a foreground region within the original image as described regarding FIG. 1 above. The multi-touch surface 610 captures the user's input (a stroke 641a by hand 640 in the present example) on the working image 631 of the multi-touch surface 610 and associates it with the foreground region 631a.

Similarly in an example shown in FIG. 6B, a user may select, via the image editor interface, to provide a background input (i.e., a "remove" gesture) on the multi-touch surface 610 indicative of a background region within the original image as described regarding FIG. 1 above. The multi-touch surface 610 captures the user's input (a stroke 641b by hand 640 in the present example) on the working image 631 of the multi-touch surface 610 and associates it with the background region. In examples, the multi-touch surface 610 may utilize a touch capture module such as touch capture module 120 of FIG. 1 and/or touch capture module 220 of FIG. 2 to capture inputs. The captured touches may be passed to a background removal module such as the background removal module 122 of FIG. 1 and/or the background removal module 222 of FIG. 2.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:
1. A method comprising:
  displaying, by a computing system, an image on a display while also projecting, by a projector, a working version of the image onto a multi-touch surface to receive a touch input;

projecting, by the projector, an image editor interface onto the multi-touch surface, the image editor interface comprising first and second user-selectable control items;
receiving, by the computing system, a foreground input on the multi-touch surface indicative of a foreground region within the image and a background input on the multi-touch surface indicative of a background region within the image, wherein the foreground input comprises a user selection of the first user-selectable control item of the image editor interface projected onto the multi-touch surface, and wherein the background input comprises a user selection of the second user-selectable control item of the image editor interface projected onto the multi-touch surface;
removing, by the computing system, the background region from the image based on the foreground input and the background input;
displaying, by the computing system, a revised image based on removing the background region from the image on the display, wherein displaying the image and displaying the revised image occur on the display simultaneously and are in addition to a display of the working version of the image projected onto the multi-touch surface; and
rotating, responsive to a rotation user input on the image editor interface projected by the projector, the working version of the image while the revised image on the display remains in an original orientation.

2. The method of claim 1, wherein the display is in a vertical orientation, and wherein the multi-touch surface is in a horizontal orientation.

3. The method of claim 1, further comprising:
receiving, by the computing system, a manipulation input on the multi-touch surface to cause the working version of the image projected on the multi-touch surface to be re-positioned; and
re-positioning the working version of the image on the multi-touch surface based on the manipulation input without moving the revised image on the display.

4. The method of claim 1, further comprising:
reversing, by the computing system, the removing of the background region in response to a user touch of the multi-touch surface.

5. The method of claim 1, further comprising:
repeating, by the computing system, the removing of the background on in response to a user touch of the multi-touch surface.

6. A computing system comprising:
a processing resource;
a display device to display an image;
a projector to project a working version of the image onto a multi-touch surface, the multi-touch surface to receive a touch input, wherein the projector is to further project an image editor interface onto the multi-touch surface, the image editor interface comprising user-selectable control items;
non-transitory storage medium storing instructions executable by the processing resource to:
receive a foreground input on the multi-touch surface indicative of a foreground region within the image and to receive a background input on the multi-touch surface indicative of a background region within the image, wherein the foreground input comprises a user selection of a first user-selectable control item of the user-selectable control items of the image editor interface projected onto the multi-touch surface, and wherein the background input comprises a user selection of a second user-selectable control item of the user-selectable control items of the image editor interface projected onto the multi-touch surface;
remove the background region from the image based on the foreground input and the background input to form a revised image;
display the revised image on the display device while the background region is removed from the image, wherein displaying the image and displaying the revised image occur on the display device simultaneously and are in addition to a display of the working version of the image projected onto the multi-touch surface; and
rotating, responsive to a rotation user input on the image editor interface projected by the projector, the working version of the image while the revised image on the display device remains in an original orientation of the image.

7. The computing system of claim 6, wherein the instructions are executable by the processing resource to:
receive a manipulation input on the multi-touch surface to cause the working version of the image to be manipulated, and to manipulate the working version of the image on the multi-touch surface based on the manipulation input.

8. The computing system of claim 7, wherein the manipulation input is selected from the group consisting of: a scaling input, and a repositioning input.

9. A non-transitory computer-readable storage medium storing instructions that upon execution cause a system to:
cause projection, by a projector, of a projected image onto a multi-touch surface to receive a touch input, the projected image being representative of an original image displayed on a display device;
cause projection, by the projector, of an image editor interface onto the multi-touch surface, the image editor interface comprising user-selectable control items;
receive a foreground input on the multi-touch surface indicative of a foreground region within the original image, wherein the foreground input comprises a user selection of a first user-selectable control item of the user-selectable control items of the image editor interface projected onto the multi-touch surface;
receive a background input on the multi-touch surface indicative of a background region within the original image, wherein the background input comprises a user selection of a second input user-selectable control item of the user-selectable control items of the image editor interface projected onto the multi-touch surface;
remove the background region of the original image to form a modified image from the original image based on the foreground input and the background input;
display the modified image with the background region removed concurrently with the original image on the display device, while also displaying the projected image on the multi-touch surface; and
rotating, responsive to a rotation user input on the image editor interface projected by the projector, the projected image without rotating the modified image on the display device.

10. The non-transitory computer-readable storage medium of claim 9, wherein the instructions upon execution cause the system to further:
receive a manipulation input on the multi-touch surface to cause the projected image to be manipulated; and manipulate the projected image on the multi-touch surface based on the manipulation input.

11. The method of claim 1, further comprising:

in response to a user gesture in the image editor interface projected onto the multi-touch surface, manipulating a portion of the image projected onto the multi-touch surface.

12. The method of claim 11, wherein the manipulating comprises moving or scaling the portion of the image.

13. The computing system of claim 6, wherein the display device is in a vertical orientation, and wherein the multi-touch surface is in a horizontal orientation.

14. The computing system of claim 6, wherein the foreground input comprises a first gesture in the image editor interface, and the background input comprises a second gesture in the image editor interface.

15. The non-transitory computer-readable storage medium of claim 9, wherein the foreground input further comprises a first gesture in the image editor interface, and the background input comprises a second gesture in the image editor interface.

16. The method of claim 1, wherein the image editor interface projected by the projector onto the multi-touch surface comprises a background removal button that when activated by user touch causes the removing of the background region.

17. The non-transitory computer-readable storage medium of claim 9, wherein the image editor interface projected by the projector onto the multi-touch surface comprises a background removal button that when activated by user touch causes the removing of the background region.

18. The computing system of claim 6, wherein the image editor interface projected by the projector onto the multi-touch surface comprises a background removal button that when activated by user touch causes the removing of the background region.

* * * * *